US012174589B2

(12) United States Patent
Masaki

(10) Patent No.: US 12,174,589 B2
(45) Date of Patent: Dec. 24, 2024

(54) ELECTRONIC WATCH HAVING A DATE INDICATOR BETWEEN A BATTERY AND A MOVEMENT

(71) Applicant: Seiko Epson Corporation, Tokyo (JP)

(72) Inventor: Takaya Masaki, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 439 days.

(21) Appl. No.: 17/645,373

(22) Filed: Dec. 21, 2021

(65) Prior Publication Data

US 2022/0197224 A1 Jun. 23, 2022

(30) Foreign Application Priority Data

Dec. 22, 2020 (JP) ................................ 2020-212195

(51) Int. Cl.
*G04C 10/02* (2006.01)
*G04R 60/02* (2013.01)

(52) U.S. Cl.
CPC ............ *G04C 10/02* (2013.01); *G04R 60/02* (2013.01)

(58) Field of Classification Search
CPC ...................................................... G04C 10/00
See application file for complete search history.

(56) References Cited

U.S. PATENT DOCUMENTS

| | | | | |
|---|---|---|---|---|
| 6,310,836 | B1 * | 10/2001 | Fujii | G04B 19/30 368/205 |
| 2005/0169112 | A1 | 8/2005 | Shimizu | |
| 2015/0268639 | A1 | 9/2015 | Abe et al. | |
| 2016/0179061 | A1 | 6/2016 | Abe et al. | |
| 2017/0168462 | A1 | 6/2017 | Ryu et al. | |
| 2019/0387288 | A1 * | 12/2019 | Scordilis | G04G 9/0064 |

FOREIGN PATENT DOCUMENTS

| | | | |
|---|---|---|---|
| JP | S51-124471 | A | 10/1976 |
| JP | S52-117165 | A | 10/1977 |
| JP | S62-004639 | U | 1/1987 |
| JP | S63-289480 | A | 11/1988 |
| JP | H11-040182 | A | 2/1999 |
| JP | 2015-175805 | A | 10/2015 |
| JP | 2017-146266 | A | 8/2017 |
| JP | 2018-163166 | A | 10/2018 |
| JP | 2020-134141 | A | 8/2020 |
| JP | 2020-134276 | A | 8/2020 |

* cited by examiner

*Primary Examiner* — Renee S Luebke
(74) *Attorney, Agent, or Firm* — Harness, Dickey & Pierce, P.L.C.

(57) ABSTRACT

An electronic watch includes a hand configured to indicate time, a dial having a through hole through which a hand shaft configured to rotate the hand passes, a movement including a motor configured to rotate the hand shaft, a battery configured to supply power to the motor, and a solar panel configured to supply power to the battery, wherein the movement, the battery, the solar panel, and the dial are disposed in this order, the battery has a first opening through which the hand shaft passes, and the solar panel has a second opening through which the hand shaft passes.

6 Claims, 7 Drawing Sheets

ELECTRONIC WATCH HAVING A DATE INDICATOR BETWEEN A BATTERY AND A MOVEMENT

The present application is based on, and claims priority from JP Application Serial Number 2020-212195, filed Dec. 22, 2020, the disclosure of which is hereby incorporated by reference herein in its entirety.

BACKGROUND

1. Technical Field

The present disclosure relates to an electronic watch.

2. Related Art

An electronic watch with a battery has been widely used. As indicated in JP-A-2018-163166, a battery having a button shape has been generally used for an electronic watch. A movement is provided with a motor, a torque transmission mechanism by a toothed gear, a mechanism for rotating a hand by rotation of a setting stem, a printed wired board that drives the motor, and an area for housing a battery.

As disclosed in JP-A-2018-163166, when the battery is disposed in the movement, a thickness and a size of the battery are great constraints, and thus a reduction in thickness and size of the movement is limited.

SUMMARY

An electronic watch includes a hand configured to indicate time, a dial having a through hole through which a hand shaft configured to rotate the hand passes, a movement including a motor configured to rotate the hand shaft, and a circuit electrically coupled to the motor, a battery electrically coupled to the circuit and configured to supply power to the motor, and a solar panel configured to supply power to the battery, wherein the movement, the battery, the solar panel, and the dial are disposed in this order, the battery has a first opening through which the hand shaft passes, and the solar panel has a second opening through which the hand shaft passes.

DESCRIPTION OF EXEMPLARY EMBODIMENTS

First Exemplary Embodiment

Figure 1:
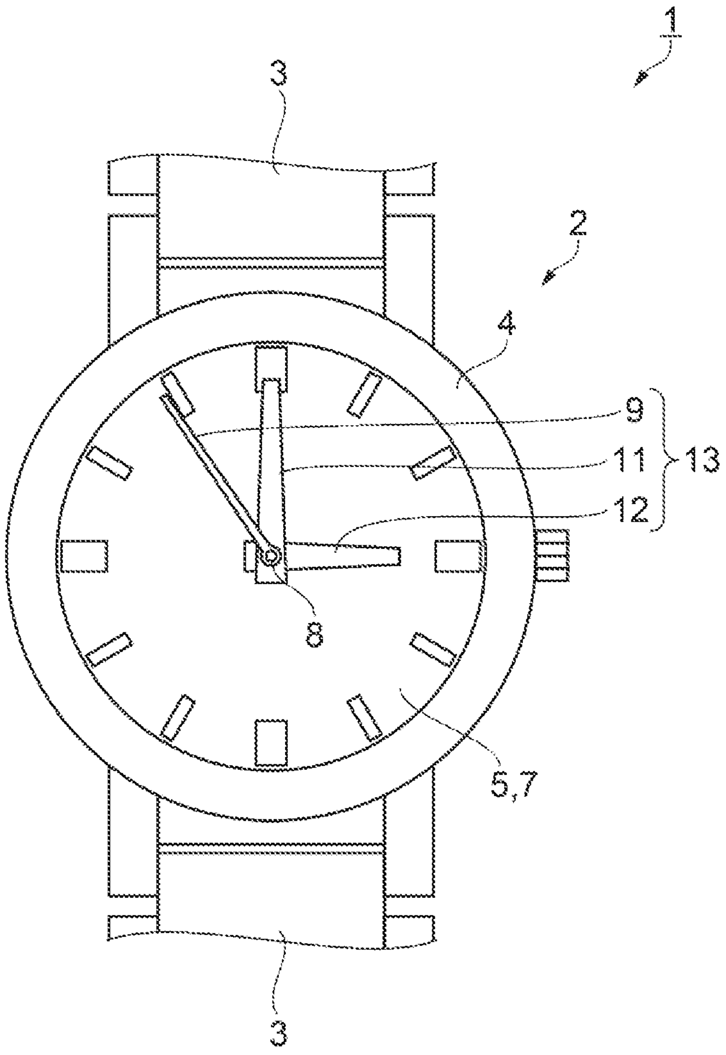
FIG. 1 is a schematic plan view illustrating a configuration of an electronic watch according to a first exemplary embodiment.

As illustrated in FIG. 1, an electronic watch 1 includes a watch body 2 and a watch strap 3. The watch strap 3 coupled to the watch body 2 is disposed on an upper side and a lower side of the watch body 2 in the diagram. The watch strap 3 is used to wrap around a human arm.

Figure 2:
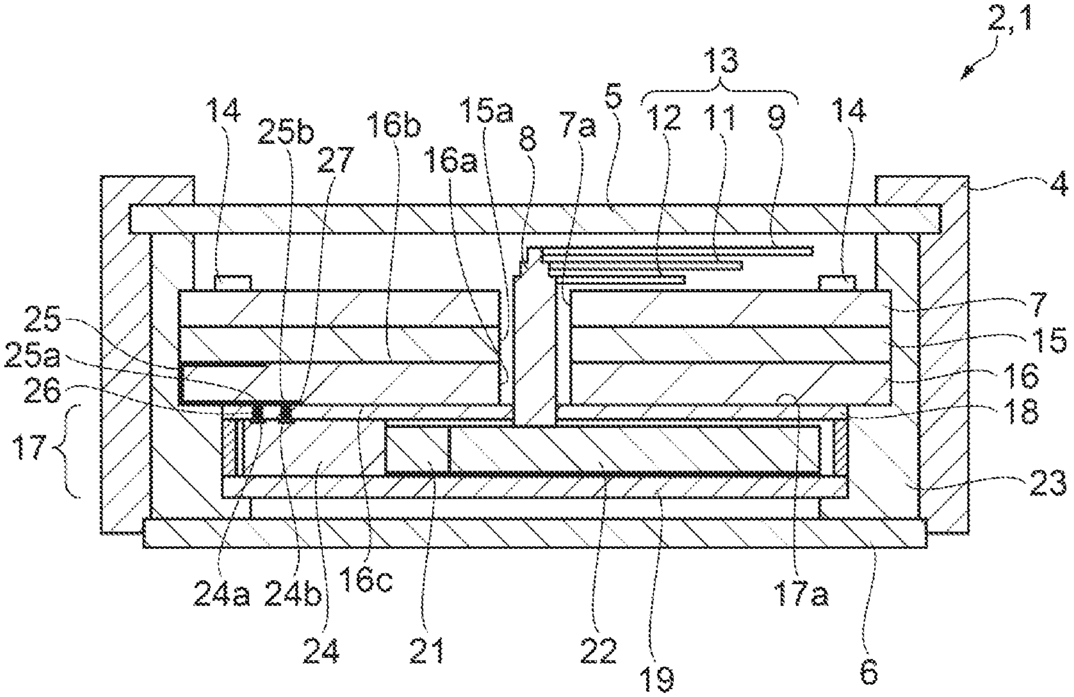
FIG. 2 is a schematic side cross-sectional view illustrating a configuration of the electronic watch.

As illustrated in FIGS. 1 and 2, the watch body 2 includes a cylindrical outer case 4. A cover glass 5 is disposed at one end along an axis of the outer case 4, and a case back 6 is disposed at the other end. The cover glass 5 side of the electronic watch 1 is a front surface side, and the case back 6 side is a back surface side.

A dial 7 is disposed on a back surface side of the cover glass 5. The dial 7 is optically transparent.

A hand shaft 8 is disposed at the center of the dial 7 in plan view of the dial 7. A seconds hand 9, a minute hand 11, and an hour hand 12 indicating time are attached to the hand shaft 8. Hereinafter, the seconds hand 9, the minute hand 11, and the hour hand 12 are referred to as a hand 13. The hand shaft 8 is formed of three rotary shafts to which the seconds hand 9, the minute hand 11, and the hour hand 12 are attached. The hand 13 rotates about the hand shaft 8. The cover glass 5 is transparent, and the dial 7 and the hand 13 are visible through the cover glass 5.

A first through hole *7a* is formed at the center of the dial 7. The hand shaft 8 passes through the first through hole *7a*. The dial 7 is provided with a mark 14. The mark 14 is disposed concentrically about the first through hole *7a*. The mark 14 is disposed every 30 degrees. The hand 13 indicates time with the mark 14 as a graduation.

A solar panel 15 is disposed on a back surface side of the dial 7. Light passing through the dial 7 is applied to the solar panel 15. The solar panel 15 receives light and generates power. A battery 16 is disposed on a back surface side of the solar panel 15. A movement 17 is disposed on a back surface side of the battery 16. The movement 17, the battery 16, the solar panel 15, and the dial 7 are disposed in order of the movement 17, the battery 16, the solar panel 15, and the dial 7 from the movement 17 toward the dial 7.

The movement 17 includes a main plate 18, a train wheel bridge 19, a motor 21, a circuit portion 24 as a circuit, a train wheel mechanism 22, the hand shaft 8, and the like. The circuit portion 24 is disposed on a back surface side of the main plate 18. The circuit portion 24 outputs a drive current that drives the motor 21. The motor 21 and the train wheel mechanism 22 are disposed between the main plate 18 and the train wheel bridge 19. The train wheel mechanism 22 transmits torque of the motor 21 to the hand shaft 8. The hand shaft 8 is a part of the movement 17. The motor 21 and the train wheel mechanism 22 rotate the hand shaft 8. A guide frame 23 is disposed between the dial 7, the solar panel 15, the battery 16, and the movement 17, and the outer case 4. A position of the dial 7, the solar panel 15, the battery 16, and the movement 17 in a thickness direction of the watch body 2 is determined by the guide frame 23.

The solar panel 15 is disposed between the dial 7 and the battery 16. The solar panel 15 has a second opening *15a* through which the hand shaft 8 passes. The second opening *15a* is a through hole. The second opening *15a* and the first through hole 7*a* are disposed so as to overlap each other, and the hand shaft 8 passes through both of the second opening 15*a* and the first through hole 7*a*. The solar panel 15 provides power to the battery 16.

The battery 16 is disposed between the solar panel 15 and the movement 17. The battery 16 has a first opening 16*a* through which the hand shaft 8 passes. The first opening 16*a* is a through hole. The first opening 16*a*, the second opening 15*a*, and the first through hole 7*a* are disposed so as to overlap each other, and the hand shaft 8 passes through all of the first opening 16*a*, the second opening 15*a*, and the first through hole 7*a*. The circuit portion 24 is electrically coupled to the battery 16. The battery 16 supplies power to the motor 21 via the circuit portion 24.

According to this configuration, the battery 16 and the solar panel 15 are disposed between the dial 7 and the movement 17. The hand shaft 8 passes through the first opening 16*a* of the battery 16 and the second opening 15*a* of the solar panel 15. The hand shaft 8 rotates the hand 13 disposed on the dial 7 side.

Therefore, the movement 17 does not have an area where the battery 16 is disposed, and thus the movement 17 can be made thinner and smaller. Since the battery 16 is disposed close to the solar panel 15, electrical coupling can be easily established between the solar panel 15 and the battery 16.

According to this configuration, since the first through hole 7*a*, the first opening 16*a*, and the second opening 15*a* are through holes, the hand shaft 8 can pass through the first through hole 7*a*, the first opening 16*a*, and the second opening 15*a*.

In the electronic watch 1, the solar panel 15 and the battery 16 are in contact with each other. According to this configuration, since the solar panel 15 and the battery 16 are in contact with each other, the solar panel 15 is reinforced. Therefore, damage to the solar panel 15 during a manufacturing step can be suppressed. Further, since the solar panel 15 and the battery 16 are located close to each other, electrical coupling can be easily established between the solar panel 15 and the battery 16. Since the solar panel 15 and the battery 16 are integrated together, the solar panel 15 and the battery 16 can be easily incorporated into the watch body 2.

The battery 16 includes a first surface 16*b* on the dial 7 side and a second surface 16*c* on the main plate 18 side. A first wiring substrate 25 is disposed on the battery 16 from the first surface 16*b* to the second surface 16*c* along a side surface. The first wiring substrate 25 includes a first electrode 25*a* and a second electrode 25*b* at a surface facing the movement 17. The first electrode 25*a* and the second electrode 25*b* are electrically coupled to an electrode of the battery 16. The circuit portion 24 includes a third electrode 24*a* and a fourth electrode 24*b* at a surface facing the battery 16. A first spring 26 is disposed between the first electrode 25*a* and the third electrode 24*a*. The first spring 26 electrically couples the first electrode 25*a* and the third electrode 24*a*. A second spring 27 is disposed between the second electrode 25*b* and the fourth electrode 24*b*. The second spring 27 electrically couples the second electrode 25*b* and the fourth electrode 24*b*. A through hole is formed in the main plate 18 at a place where the first spring 26 and the second spring 27 are disposed. Thus, even with the main plate 18 between the battery 16 and the circuit portion 24, the first spring 26 and the second spring 27 can be electrically coupled to the circuit portion 24. Note that, when the battery 16 is adhesively fixed to the movement 17, stability of electrical coupling between the battery 16 and the movement 17 can be improved.

In this way, the movement 17 includes, on an upper surface 17*a* side facing the battery 16, the third electrode 24*a* and the fourth electrode 24*b* that are electrically coupled to the battery 16. The third electrode 24*a* and the fourth electrode 24*b* are disposed on the surface on the battery 16 side, thereby facilitating electrical coupling to the battery 16.

In plan view viewed from an axial direction of the hand shaft 8, the size of the battery 16 is the same as that of the dial 7. According to this configuration, by adopting the battery 15 as a battery having the same size as that of the dial 7 in the plan view viewed from the axial direction of the hand shaft 8, a larger battery can be adopted than when the battery 16 is included in the movement 17, and thus capacity of the battery 16 can be increased. Note that “the same” also includes “substantially the same”.

The battery 16 is an all-solid battery. Specifically, the battery 16 is an all-solid lithium secondary battery.

According to this configuration, since the battery 16 is an all-solid battery, a leak does not need to be taken into consideration, and thus safety can be ensured. The battery 16 is an electrically chargeable all-solid secondary battery, but may also be used as a primary battery.

Figure 3:
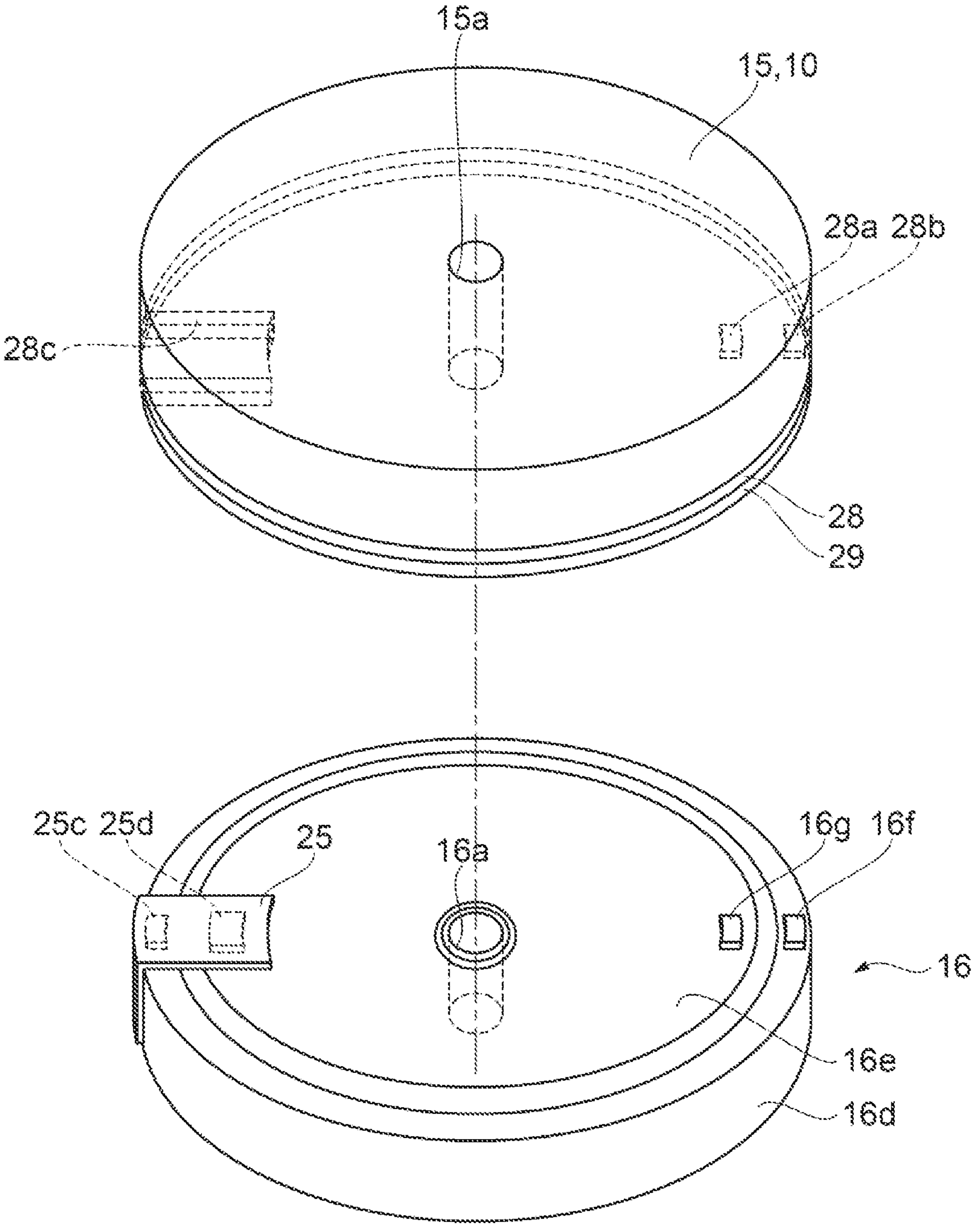
FIG. 3 is a schematic exploded perspective view illustrating a configuration of a battery and a solar panel.
Figure 4:
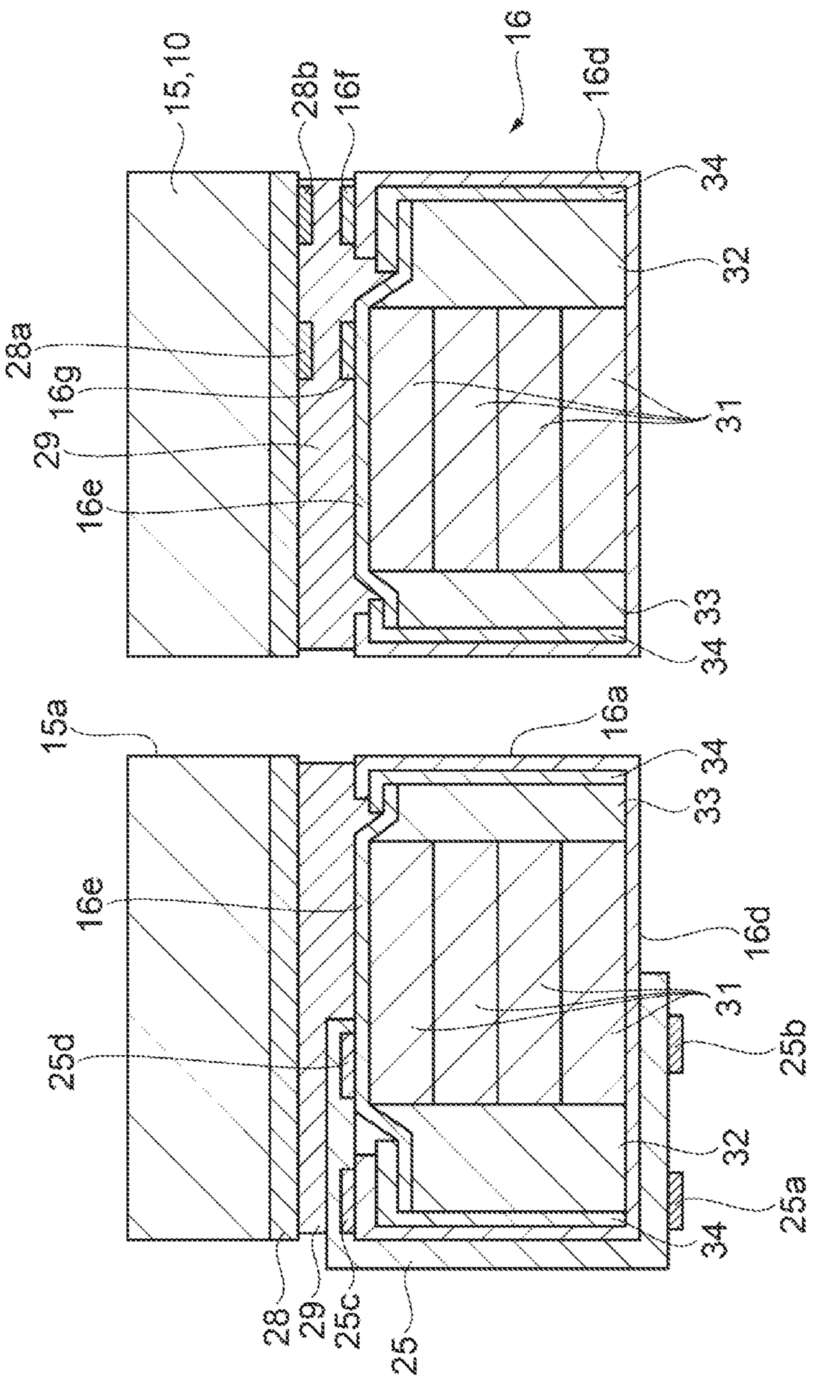
FIG. 4 is a schematic side cross-sectional view illustrating a structure of the battery and the solar panel.

Next, the solar panel 15 and the battery 16 will be described according to FIGS. 3 to 6. As illustrated in FIGS. 3 and 4, the solar panel 15 includes a solar circuit portion 28 at a surface on a side facing the battery 16. The solar panel 15 includes a solar cell 10 and the solar circuit portion 28.

The solar circuit portion 28 includes a fifth electrode 28*a* as an electrode and a sixth electrode 28*b* as an electrode. Power generated by the solar panel 15 is output to the fifth electrode 28*a* and the sixth electrode 28*b*. Note that the arrangement of the electrodes included in the solar circuit portion 28 is not limited to the arrangement illustrated in FIG. 4.

A through hole is disposed in the solar circuit portion 28 so as to overlap the second opening 15*a*. The hand shaft 8 passes through the through hole of the solar circuit portion 28. A notch portion 28*c* is formed in the solar circuit portion 28 at a place facing the first wiring substrate 25. The notch portion 28*c* is larger than the first wiring substrate 25. When the solar panel 15 and the battery 16 overlap each other, the solar circuit portion 28 does not overlap the first wiring substrate 25.

The battery 16 includes a positive electrode 16*d* and a negative electrode 16*e*. The first wiring substrate 25 includes a seventh electrode 25*c* and an eighth electrode 25*d*. The seventh electrode 25*c* is electrically coupled to the positive electrode 16*d* and the first electrode 25*a*. The eighth electrode 25*d* is electrically coupled to the negative electrode 16*e* and the second electrode 25*b*.

A positive electrode pad 16*f* as an electrode is disposed on the positive electrode 16*d* at a place facing the sixth electrode 28*b*. A negative electrode pad 16*g* as an electrode is disposed on the negative electrode 16*e* at a place facing the fifth electrode 28*a*. The solar panel 15 includes the fifth electrode 28*a* and the sixth electrode 28*b* at a surface facing the battery 16. The battery 16 includes the negative electrode pad 16*g* and the positive electrode pad 16*f* at a surface facing the solar panel 15. The solar panel 15 and the battery 16 are joined by an anisotropic conductive film 29.

In the anisotropic conductive film 29, conductive particles are dispersed in a thermosetting resin. When the solar panel 15 and the battery 16 are thermally crimped with the anisotropic conductive film 29 sandwiched therebetween, the thermosetting resin contracts to bond the solar panel 15 and the battery 16. Since the density of the conductive particles increases between the positive electrode pad 16*f* and the sixth electrode 28_b_, the positive electrode pad 16_f_ and the sixth electrode 28_b_ are electrically coupled to each other. Since the density of the conductive particles increases between the negative electrode pad 16_g_ and the fifth electrode 28_a_, the negative electrode pad 16_f_ and the fifth electrode 28_a_ are electrically coupled to each other. Since the density of the conductive particles is low between the positive electrode pad 16_f_ and the negative electrode pad 16_g_, the positive electrode pad 16_f_ and the negative electrode pad 16_g_ are in an electrically isolated state.

According to this configuration, since the solar panel 15 and the battery 16 are joined by the anisotropic conductive film 29, electrical coupling can be easily established between the solar panel 15 and the battery 16. An energy loss on energization between the solar panel 15 and the battery 16 can be suppressed. Since the solar panel 15 and the battery 16 are integrated together, the solar panel 15 and the battery 16 can be easily incorporated into the watch body 2.

As illustrated in FIG. 4, the positive electrode 16_d_ is a bottomed cylinder. Four disk-shaped battery units 31 overlap each other and are installed in the positive electrode 16_d_. The battery units 31 overlap each other in a cylindrical shape. The number of the battery units 31 installed in one battery 16 is not particularly limited. The battery unit 31 is used between about 2.8 v and about 4.2 v. By using a combination of parallel coupling and series coupling of the plurality of battery units 31, a voltage value needed for the battery 16 can be adjusted.

A cylindrical first insulating portion 32 is installed on an outer circumference of the overlapped battery units 31, and a second insulating portion 33 is installed on an inner circumference. The circular negative electrode 16_e_ is installed on an upper side of the battery units 31, the first insulating portion 32, and the second insulating portion 33 in the diagram, and a third insulating portion 34 is installed on an outer circumferential side of the negative electrode 16_e_ and on a side surface side of the first insulating portion 32. The third insulating portion 34 is disposed between the positive electrode 16_d_ and the negative electrode 16_e_, and is also disposed between the positive electrode 16_d_ and the second insulating portion 33. Furthermore, the third insulating portion 34 is installed on an inner circumferential side of the negative electrode 16_e_ and on a side surface side of the second insulating portion 33. Also on the inner circumferential side of the negative electrode 16_e_, the third insulating portion 34 is disposed between the negative electrode 16_e_ and the positive electrode 16_d_, and is also disposed between the positive electrode 16_d_ and the second insulating portion 33.

The first insulating portion 32 and the second insulating portion 33 fix the battery units 31 such that the battery units 31 do not move in a left-and-right direction in the diagram. Furthermore, the first insulating portion 32 and the second insulating portion 33 perform insulation such that the side surface of the battery units 31 does not conduct with the positive electrode 16_d_. The third insulating portion 34 insulates the positive electrode 16_d_ and the negative electrode 16_e_. A material of the positive electrode 16_d_ and the negative electrode 16_e_ is stainless steel. A material of the first insulating portion 32, the second insulating portion 33, and the third insulating portion 34 is insulating acrylic resin.

Figure 5:
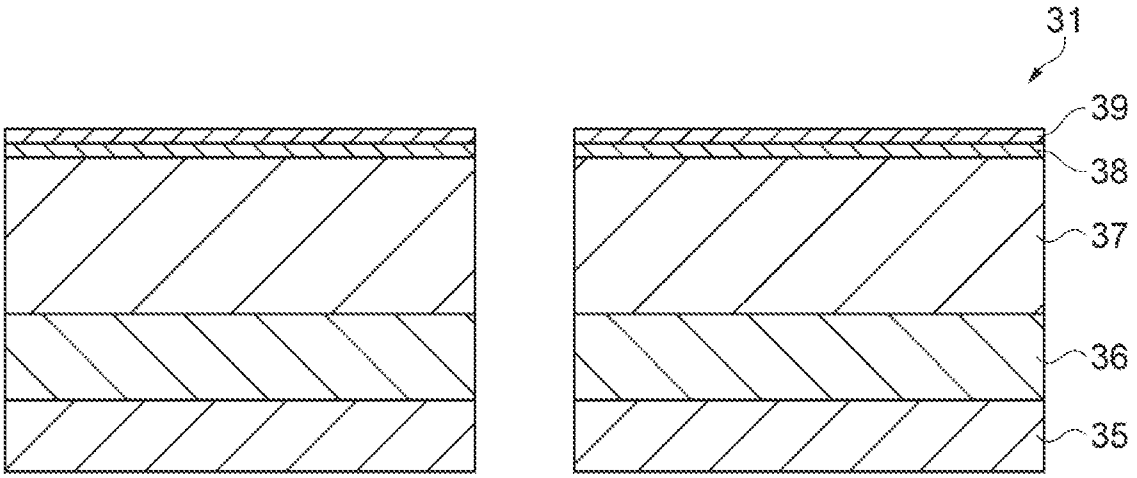
FIG. 5 is a schematic side cross-sectional view illustrating a structure of a battery unit.

As illustrated in FIG. 5, the battery unit 31 includes a lower electrode 35. Then, a carbon sheet 36, an electrode composite 37, a separation film 38, and an upper electrode 39 are installed on the lower electrode 35 so as to overlap each other in this order.

The lower electrode 35 is an electrode that serves as a positive electrode, and functions as a substrate that maintains a structure. A material of the lower electrode 35 is copper. The carbon sheet 36 is a carbon film that efficiently flows a current between the lower electrode 35 and the electrode composite 37.

The separation film 38 is a film that prevents a short circuit between the electrode composite 37 and the upper electrode 39, and is a film formed of LBO (lithium triborate), LCBO (lithium carbon borate), and the like. In the present exemplary embodiment, for example, LCBO is adopted for the separation film 38. Further, the upper electrode 39 is an electrode that serves as a negative electrode, and is a lithium film.

Figure 6:
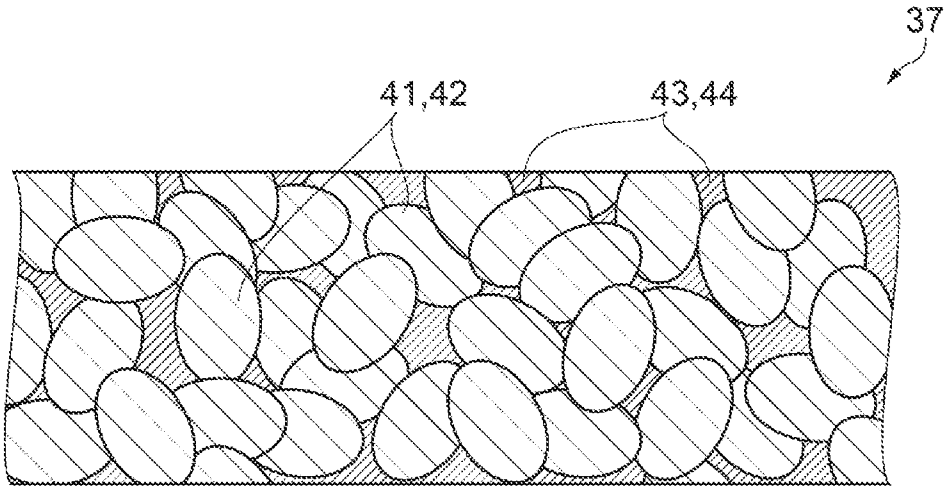
FIG. 6 is a schematic side cross-sectional view of main portions illustrating a structure of an electrode composite.

As illustrated in FIG. 6, the electrode composite 37 includes an active material forming body 41. The active material forming body 41 is a structure in which a plurality of active material particles 42 being a formation material are coupled and formed to be porous. A communication hole 43 is located between the active material particles 42. The communication hole 43 is in the form of a hole in which cavities between the active material particles 42 communicate in a mesh pattern.

The communication hole 43 is filled with a non-crystalline solid electrolyte 44. Since the communication hole 43 is installed in a mesh pattern, the active material forming body 41 and the solid electrolyte 44 are in contact with each other over a wide area. Thus, lithium ions easily move between the active material forming body 41 and the solid electrolyte 44.

Further, the solid electrolyte 44 fills the communication hole 43 between the active material forming bodies 41. Therefore, the solid electrolyte 44 is a continuous structure having a mesh pattern. The lithium ions move within the solid electrolyte 44. Then, since the solid electrolyte 44 in a mesh pattern fills the communication hole 43, a path in which lithium ions can move to every corner of the active material forming body 41 is secured. The solid electrolyte 44 is in a non-crystalline form, has low resistance of a grain boundary, and can thus make the lithium ions easy to move. As a result, the battery 16 can stably perform a charging-discharging cycle.

When the battery 16 is charged, the lithium ions in the solid electrolyte 44 move from the active material forming body 41 of the electrode composite 37 to the upper electrode 39. The upper electrode 39 is a negative electrode of a lithium film. Then, when the battery 16 is discharged, the lithium ions in the solid electrolyte 44 move from the upper electrode 39 to the active material forming body 41 of the electrode composite 37.

A lithium double oxide is used as a material for forming the active material particles 42. Note that the lithium double oxide is an oxide that always contains lithium, contains two or more kinds of metal ions, and does not contain oxoacid ions. Examples of the lithium double oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$.

In addition, solid solutions in which a part of atoms of these lithium double oxide is substituted with other transition metal, a typical metal, an alkali metal, an alkali rare earth, lanthanoid, chalcogenide, halogen, and the like may also be included in the lithium double oxide, and these solid solutions can also be used as positive electrode active materials. In the present exemplary embodiment, for example, $LiCoO_2$ is used for the active material particles 42.

$Li_2+XC_1$—$XBXO_3$ is used for a material of the solid electrolyte 44. X is a substitution rate of boron B and represents a real number greater than 0 and less than or equal to 1. Therefore, $Li_2CO_3$ when X is 0 is not included in the solid of the solid electrolyte 44, and $Li_3BO_3$ when X is 1 is included. Then, in the communication hole 43, the solid electrolyte 44 is non-crystalline.

Second Exemplary Embodiment

The present exemplary embodiment is different from the first exemplary embodiment in a point that the first opening 16*a* in the battery 16 the second opening 15*a* of the solar panel 15 are a slit. Note that configurations identical to those in the first exemplary embodiment will be denoted by the same reference signs and redundant descriptions will be omitted.

Figure 7:
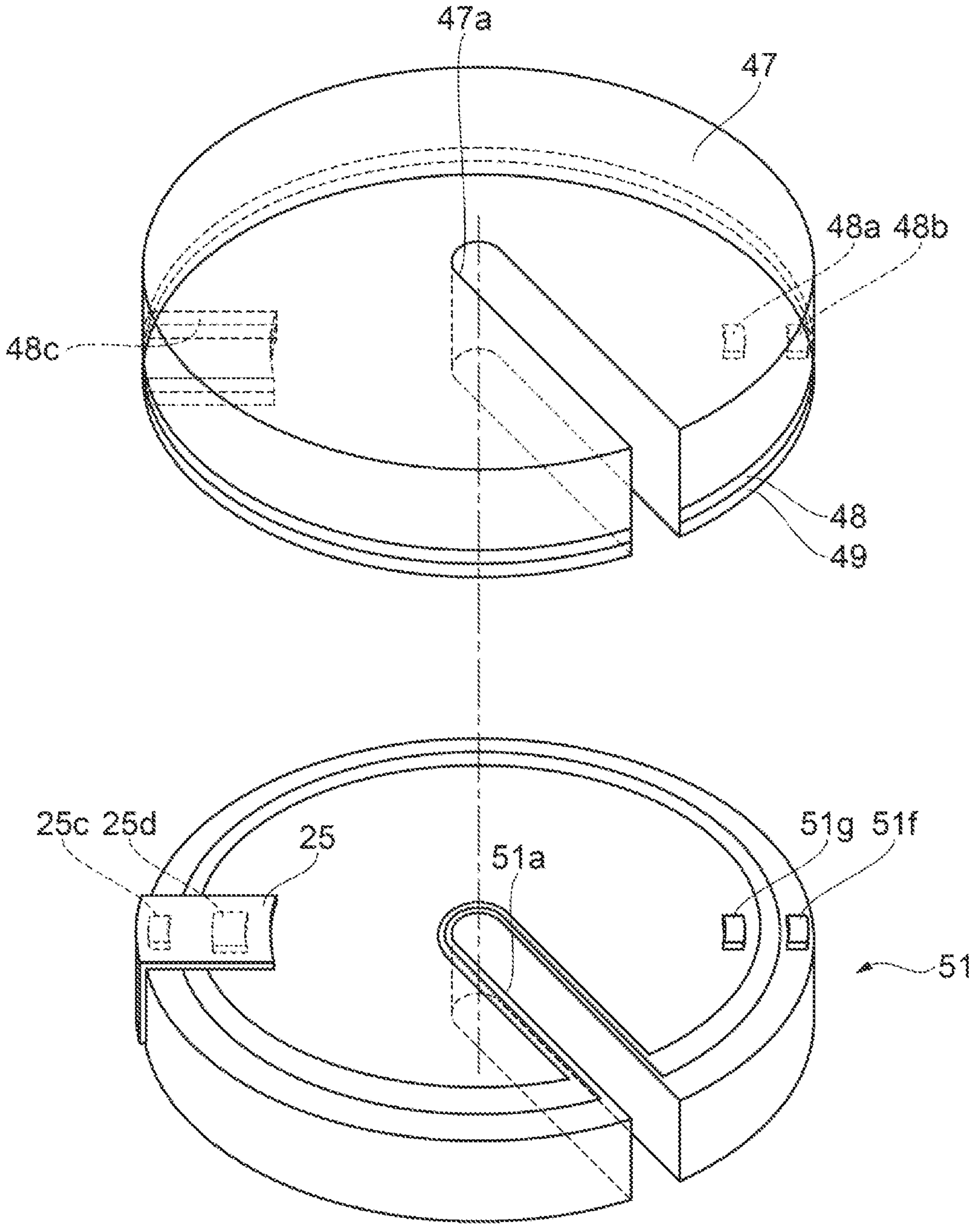
FIG. 7 is a schematic exploded perspective view illustrating a configuration of a battery and a solar panel according to a second exemplary embodiment.

As illustrated in FIG. 7, a solar panel 47 has a second opening 47*a*. The second opening 47*a* is a slit extending from a place through which a hand shaft 8 passes toward an outer circumference of the solar panel 47.

The solar panel 47 includes a solar circuit portion 48 on surface on aside facing a battery 51. A slit is disposed in the solar circuit portion 48 at a place facing the second opening 47*a*. The hand shaft 8 passes through the slit of the solar circuit portion 48. A notch portion 48*c* is formed in the solar circuit portion 48 at a place facing a first wiring substrate 25. The notch portion 48*c* is larger than the first wiring substrate 25. When the solar panel 47 and the battery 51 overlap each other, the solar circuit portion 48 does not overlap the first wiring substrate 25.

An anisotropic conductive film 49 is disposed between the solar circuit portion 48 and the battery 51. A slit is disposed in the anisotropic conductive film 49 at a place facing the second opening 47*a*. The hand shaft 8 passes through the slit of the anisotropic conductive film 49. According to this configuration, since the second opening 47*a* is a slit, the hand shaft 8 can pass through the second opening 47*a*. The solar circuit portion 48 includes a fifth electrode 48*a* as an electrode and a sixth electrode 48*b* as an electrode.

The battery 51 has a first opening 51*a*. The first opening 51*a* is a slit extending from a place through which the hand shaft 8 passes toward an outer circumference of the battery 51. The battery 51 includes a negative electrode pad 51*g* as an electrode and a positive electrode pad 51*f* as an electrode. The negative electrode pad 51*g* and the fifth electrode 48*a* are electrically coupled to each other. The positive electrode pad 51*f* and the sixth electrode 48*b* are electrically coupled to each other.

According to this configuration, since the first opening 51*a* and the second opening 47*a* are a slit, the hand shaft 8 can pass through the first opening 51*a* and the second opening 47*a*. Further, an operator can put in and take out the solar panel 47 and the battery 51 between a dial 7 and a movement 17 by moving the solar panel 47 and the battery 51 toward the side surface.

Third Exemplary Embodiment

The present exemplary embodiment is different from the first exemplary embodiment in a point that a date indicator is disposed. Note that configurations identical to those in the first exemplary embodiment will be denoted by the same reference signs and redundant descriptions will be omitted.

Figure 8:
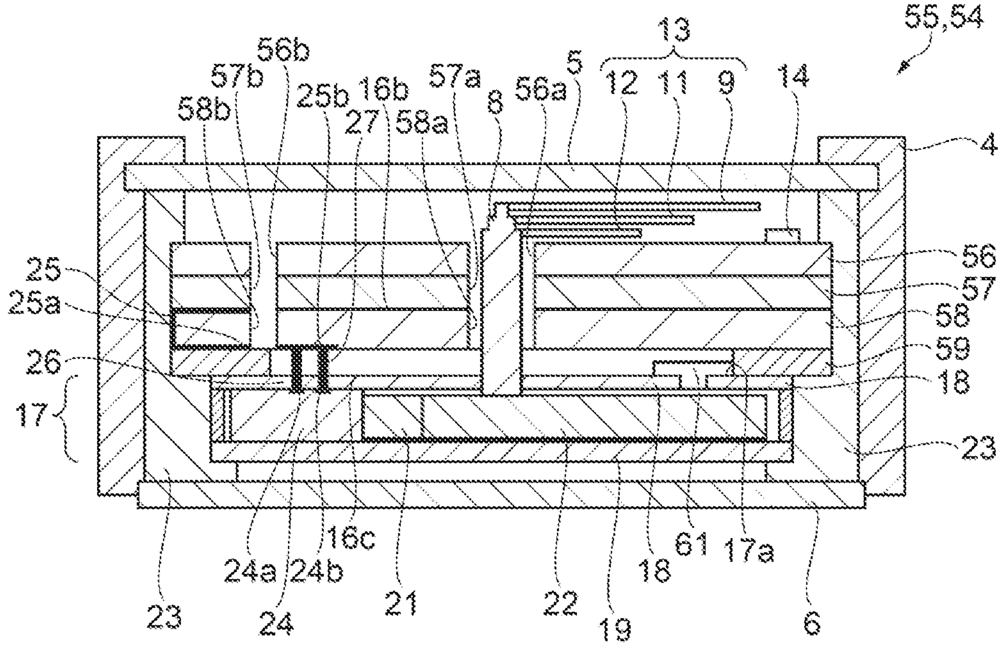
FIG. 8 is a schematic side cross-sectional view illustrating a configuration of an electronic watch according to a third exemplary embodiment.

As illustrated in FIG. 8, a watch body 55 of an electronic watch 54 includes a dial 56 corresponding to the dial 7 in the first exemplary embodiment, a solar panel 57 corresponding to the solar panel 15, and a battery 58 corresponding to the battery 16. The solar panel 57 is disposed on a back surface side of the dial 56. The battery 58 is disposed on a back surface side of the solar panel 57.

The dial 56 has a first through hole 56*a* corresponding to the first through hole 7*a*. The solar panel 57 has a second opening 57*a* corresponding to the second opening 15*a*. The battery 58 has a first opening 58*a* corresponding to the first opening 16*a*.

The electronic watch 54 includes a date indicator 59 and a date indicator driving wheel 61 between the battery 58 and a movement 17. The date indicator driving wheel 61 is driven by a train wheel mechanism 22, and the date indicator driving wheel 61 rotates the date indicator 59.

The dial 56 includes a date window 56*b* through which a mark at the date indicator 59 is visible. This mark is a number indicating a date. "1" of a first day and "31" of a 31st day correspond to the mark.

The solar panel 57 has a fourth opening 57*b* in a position corresponding to the date window 56*b*. The battery 58 has a third opening 58*b* in a position corresponding to the date window 56*b*. Thus, an operator can confirm the mark of the date indicator 59 through the date window 56*b*, the third opening 58*b*, and the fourth opening 57*b*.

Fourth Embodiment

The present exemplary embodiment is different from the first exemplary embodiment in a point that the dial 7 including the solar panel 15 and the battery 16 integrated together is provided. Note that configurations identical to those in the first exemplary embodiment will be denoted by the same reference signs and redundant descriptions will be omitted.

Figure 9:
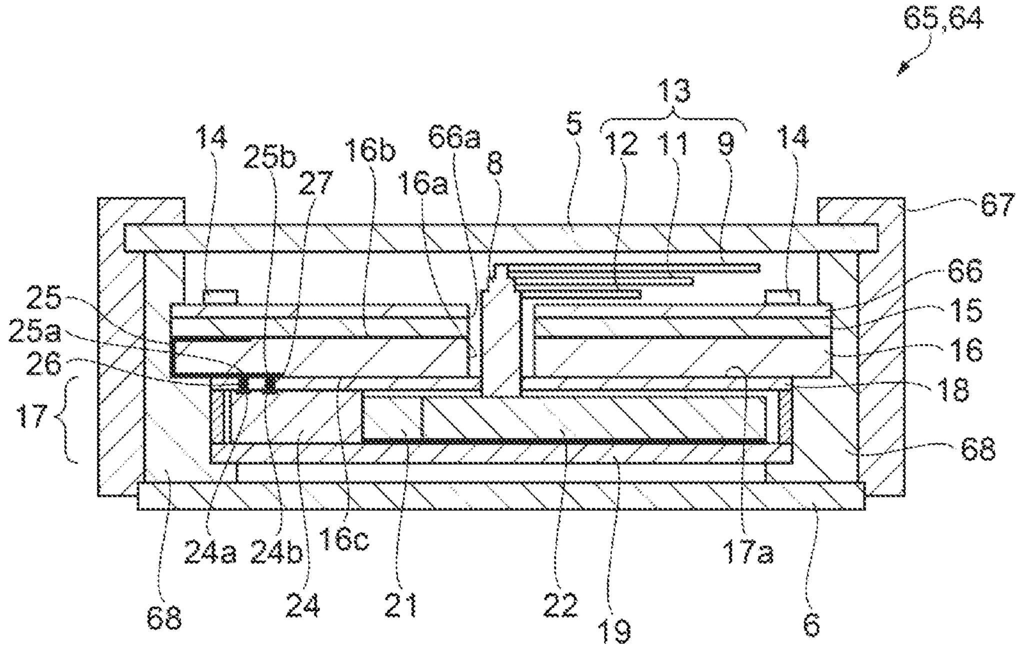
FIG. 9 is a schematic side cross-sectional view illustrating a configuration of an electronic watch according to a fourth exemplary embodiment.

As illustrated in FIG. 9, in a watch body 65 of an electronic watch 64, a dial 66 is disposed on a back surface side of a cover glass 5. The dial 66 is provided with a mark 14. The dial 66 is integrated with a solar panel 15 by an adhesive and the like.

A battery 16 is disposed on a back surface side of the dial 66. A movement 17 is disposed on a back surface side of the battery 16. The dial 66 supplies power to the battery 16. The movement 17, the battery 16, and the dial 66 are disposed in order of the movement 17, the battery 16, and the dial 66.

The dial 66 has a first through hole 66*a* as a second opening at the center. A hand shaft 8 passes through a first opening 16*a* and the first through hole 66*a*.

The movement 17, the battery 16, and the dial 66 are housed in a space enclosed by the cover glass 5, an outer case 67, and a case back 6. A guide frame 68 is disposed between the dial 66, the battery 16, and the movement 17, and the outer case 67. A position of the dial 66, the battery 16, and the movement 17 in a thickness direction of the watch body 65 is determined by the guide frame 68.

According to this configuration, the hand shaft 8 passes through the first opening 16*a* of the battery 16 and the first through hole 66*a* of the dial 66, and the hand shaft 8 rotates a hand 13 disposed on the dial 66 side. Therefore, the movement 17 does not have an area where the battery 16 is disposed, and thus the movement 17 can be made thinner and smaller. Since the battery 16 is disposed close to the dial 66 having a function of the solar panel 15, electrical coupling can be easily established between the dial 66 and the battery 16.

Fifth Exemplary Embodiment

In the first exemplary embodiment described above, a planar shape of the watch body 2, the dial 7, and the battery 16 is circular.

A planar shape of the watch body 2, the dial 7, and the battery 16 may be rectangular. The production efficiency of the battery 16 can be improved.

Sixth Exemplary Embodiment

In the first exemplary embodiment described above, a global positioning system (GPS) is not mounted. The GPS may be disposed on the movement 17. A through hole may be formed in the battery 16 at a place facing an antenna of the GPS. The antenna can receive radio waves with excellent sensitivity.

What is claimed is:

1. An electronic watch, comprising:

a hand configured to indicate time;

a dial having a through hole through which a hand shaft configured to rotate the hand passes;

a movement including a motor configured to rotate the hand shaft, and a circuit electrically coupled to the motor;

a battery electrically coupled to the circuit and configured to supply power to the motor;

a solar panel configured to supply power to the battery; and a date indicator between the battery and the movement, wherein the movement, the battery, the solar panel, and the dial are disposed in this order from the movement toward the dial, the battery has a first opening through which the hand shaft passes, and the solar panel has a second opening through which the hand shaft passes, the first opening is a through hole, or a slit extending from a place through which the hand shaft passes toward an outer circumference of the battery, and the second opening is a through hole, or a slit extending from a place through which the hand shaft passes toward an outer circumference of the solar panel, the dial includes a date window through which a mark at the date indicator is visible, and the battery has a third opening in a position corresponding to the date window, and the solar panel has a fourth opening in a position corresponding to the date window.

2. The electronic watch according to claim 1, wherein the solar panel and the battery are in contact with each other.

3. The electronic watch according to claim 1, wherein the solar panel and the battery are integrated.

4. The electronic watch according to claim 1, wherein the solar panel includes an electrode at a surface facing the battery, the battery includes an electrode at a surface facing the solar panel, and the solar panel and the battery are joined by an anisotropic conductive film.

5. The electronic watch according to claim 1, wherein, in a plan view viewed from an axial direction of the hand shaft, a size of the battery is the same as a size of the dial.

6. The electronic watch according to claim 1, wherein the battery is an all-solid battery.

* * * * *